(12) United States Patent
Fujii (10) Patent No.: US 9,008,419 B2
(45) Date of Patent: Apr. 14, 2015

(54) IMAGE PROCESSING DEVICE CONFIGURED TO PERFORM COLOR CORRECTION WITH COMPRESSED COLOR CORRECTION DATA AND IMAGE PROCESSING METHOD PERFORMING THE SAME

(71) Applicant: Masayuki Fujii, Saitama (JP)

(72) Inventor: Masayuki Fujii, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 160 days.

(21) Appl. No.: 13/746,394

(22) Filed: Jan. 22, 2013

(65) Prior Publication Data

US 2013/0188868 A1    Jul. 25, 2013

(30) Foreign Application Priority Data

Jan. 24, 2012   (JP) ................. 2012-011799

(51) Int. Cl.
*G06K 9/00* (2006.01)
*G06K 9/36* (2006.01)
*G06K 9/46* (2006.01)
*H04N 1/46* (2006.01)

(52) U.S. Cl.
CPC ............... *G06K 9/36* (2013.01); *G06K 9/4652* (2013.01); *H04N 1/46* (2013.01)

(58) Field of Classification Search
None
See application file for complete search history.

(56) References Cited

U.S. PATENT DOCUMENTS 5,241,373 A * 8/1993 Kanamori et al. ............ 348/645

FOREIGN PATENT DOCUMENTS

| JP | 2004-236042 | 8/2004 |
|---|---|---|
| JP | 2009-159493 | 7/2009 |

* cited by examiner

*Primary Examiner* — Bhavesh Mehta
*Assistant Examiner* — Feng Niu
(74) *Attorney, Agent, or Firm* — Harness, Dickey & Pierce, P.L.C.

(57) ABSTRACT

An image processing device includes a first storage unit, a calculating unit, a second storage unit, and an interpolation calculating unit. The first storage unit is configured to store values at lattice points on a plurality of unit cubes to which a color space made up of the plurality of color components is segmentalized. The calculating unit is configured to calculate a difference between a first lattice-point value stored in the first storage unit and a color component value mapped to color coordinates of the first lattice point for each of the lattice points. The second storage unit is configured to store the calculated difference on a lattice-point-by-lattice-point basis. The interpolation calculating unit is configured to calculate a second image data by reading out the stored differences designated by a first image data and performing interpolation calculation using the read-out second lattice-point values.

9 Claims, 8 Drawing Sheets

VALUES AT VERTICES ARE
REPLACED WITH ΔC' AS FOLLOWS:
P0': ΔC' [a1]=C' [a1]-Ca
P1': ΔC' [a2]=C' [a2]-Ca
P2': ΔC' [a3]=C' [a3]-Ca
P3': ΔC' [a4]=C' [a4]-Ca
P4': ΔC' [b1]=C' [b1]-Cb
P5': ΔC' [b2]=C' [b2]-Cb
P6': ΔC' [b3]=C' [b3]-Cb
P7': ΔC' [b4]=C' [b4]-Cb

COLOR SPACE FOR CYAN

COLOR SPACE FOR CYAN

COLOR SPACE FOR MAGENTA

COLOR SPACE FOR YELLOW

HEAD SCANNING DIRECTION: FORWARD TRAVEL →

FIG.7B

HEAD SCANNING DIRECTION: BACKWARD TRAVEL ←

IMAGE PROCESSING DEVICE CONFIGURED TO PERFORM COLOR CORRECTION WITH COMPRESSED COLOR CORRECTION DATA AND IMAGE PROCESSING METHOD PERFORMING THE SAME

CROSS-REFERENCE TO RELATED APPLICATIONS

The present application claims priority to and incorporates by reference the entire contents of Japanese Patent Application No. 2012-011799 filed in Japan on Jan. 24, 2012.

BACKGROUND OF THE INVENTION

1. Field of the Invention

The present invention relates to an image processing device and an image processing method that use a smaller amount of lattice-point data.

2. Description of the Related Art

A typical color correction scheme achieves highly-accurate color correction by segmentalizing a three-dimensional color space composed from an input signal to a plurality of unit cubes (three-dimensional lattices), arranging corrected data values at lattice points of the segmentalized three-dimensional color space, and performing interpolation calculation using the corrected data values of the lattice points. A scheme that compresses an amount of data used for a color conversion LUT (Look-UP-Table) by merging two color-conversion parameters is disclosed in Patent Document Application Laid-open 2009-159493, for example.

However, such conventional color correction disadvantageously requires a large amount of memory because the color space is finely divided to a plurality of three-dimensional lattices for enhancement of image quality.

There is needed to provide an image processing device and an image processing method that use a smaller amount of lattice-point data stored as values at lattice points in a color space.

SUMMARY OF THE INVENTION

It is an object of the present invention to at least partially solve the problems in the conventional technology.

According to the present invention, there is provided an image processing device for performing color correction on first image data represented by a plurality of color components to obtain second image data represented by the same color components as the color components of the first image data, the image processing device comprising: a first storage unit configured to store predetermined values as values at lattice points on a plurality of unit cubes to which a color space made up of the plurality of color components is segmentalized; a calculating unit configured to calculate a second lattice-point value that is a difference between a first lattice-point value stored in the first storage unit and a color component value mapped to color coordinates of the first lattice point for each of the lattice points; a second storage unit configured to store the calculated second lattice-point values on a lattice-point-by-lattice-point basis; and an interpolation calculating unit configured to calculate the second image data by reading out the second lattice-point values designated by the first image data from the second storage unit and performing interpolation calculation using the read-out second lattice-point values.

The present invention also provides an image processing device for performing color correction on first image data represented by a plurality of color components to obtain second image data represented by the same color components as the color components of the first image data, the image processing device comprising: a third storage unit configured to store, for each of lattice points on a plurality of unit cubes to which a color space made up of the plurality of color components is segmentalized, a third lattice-point value that is a difference between a predetermined value of the lattice point and a color component value mapped to color coordinates of the lattice point; and an interpolation calculating unit configured to calculate the second image data by reading out the third lattice-point values designated by the first image data from the third storage unit and performing interpolation calculation using the read-out third lattice-point values.

The present invention also provides an image processing method for performing color correction on first image data represented by a plurality of color components to obtain second image data represented by the same color components as the color components of the first image data, the image processing method comprising: first storing including segmentalizing a color space made up of the plurality of color components to a plurality of unit cubes and storing to a first storage unit a first lattice-point value that is a predetermined value as a value at each of lattice points on the unit cubes; calculating a second lattice-point value that is a difference between the first lattice-point value stored in the first storage unit and a color component value mapped to color coordinates of the first lattice point; second storing including storing to a second storage unit the calculated second lattice-point value on a lattice-point-by-lattice-point basis; and interpolation calculating including calculating the second image data by reading out the second lattice-point value designated by the first image data by referring to the second storage unit and performing interpolation calculation using the read-out second lattice-point value.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

First Embodiment

The present invention provides a technique suitable for fine color adjustment by which CMY input image data is color-corrected to C'M'Y' output image data, for instance. A three-dimensional color space and interpolation on which the present invention is based are described below.

Figure 1A:
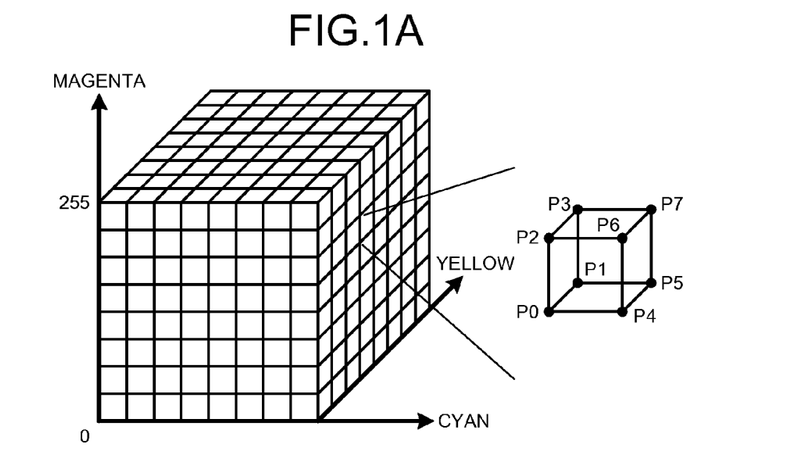
FIG. 1A is a diagram illustrating a three-dimensional color space of C(Cyan), M(Magenta), and Y(Yellow), and a unit cube composing the three-dimensional color space.

FIG. 1A illustrates a CMY three-dimensional color space. Color correction is performed by segmentalizing a three-dimensional input color space to a plurality of unit cubes (lattices) and storing output data at the lattice points of the segmentalized color space as illustrated in FIG. 1A. In the example illustrated in FIG. 1A, each of cyan (C), magenta (M), and yellow (Y) input data (8 bits each) is segmentalized to 8 cells (i.e., segmentalized to 512 unit cubes). In this example, the total number of lattice points is 9×9×9=729.

One unit cube is selected from the 512 unit cubes based on higher-order 3 bits of the input data. Conversion to output data is performed by calculating lattice-point values selected based on lower-order 5 bits of the input data by interpolation from lattice-point values stored as values of the lattice points.

Figure 1B:
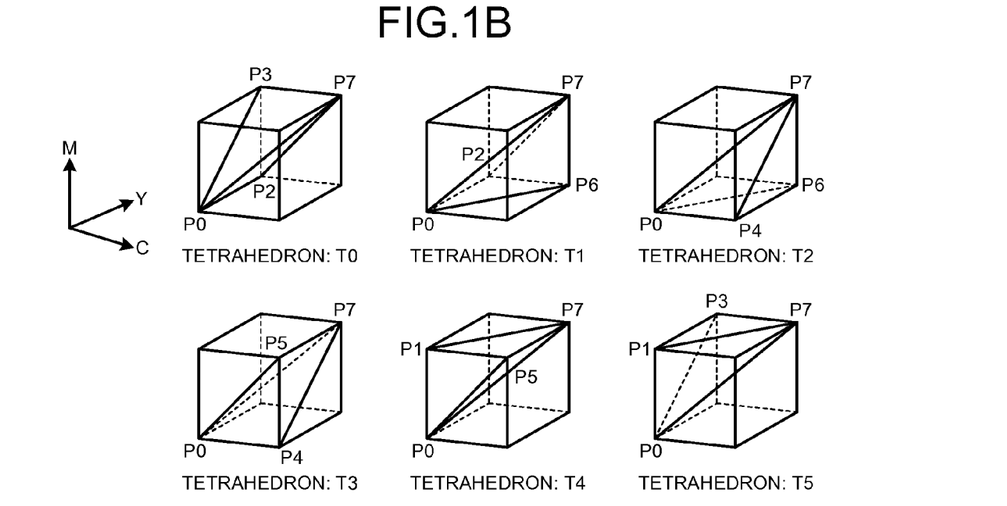
FIG. 1B is a diagram illustrating a tetrahedral interpolation scheme using the unit cube.

FIG. 1B illustrates a tetrahedral interpolation scheme which is one of interpolation schemes. According to this scheme, a cube is sub-segmentalized to six possible triangular pyramids (tetrahedrons) T0 to T5 that share vertices P0 and P7. One triangular pyramid specified by the lower-order five bits of the input data is selected from the six possible triangular pyramids. Linear interpolation of lattice point values of four vertices of the selected triangular pyramid is performed according to the following Equation (1).

$$Dout = (\Delta Pc \times \Delta c + \Delta Pm \times \Delta m + \Delta Py \times \Delta y + (P0 \times 16)) \div 16 \quad (1)$$

In Equation (1), Dout is a color correction result (any one of Cout, Mout, and Yout), $\Delta Pc$ is a difference value between vertices P in the C-axis direction (when the tetrahedron T0 is selected, for example, $\Delta Pc=P7-P3$), $\Delta Pm$ is a difference value between vertices P in the M-axis direction (when the tetrahedron T0 is selected, for example, $\Delta Pm=P3-P2$), $\Delta Py$ is a difference value between vertices P in the Y-axis direction (when the tetrahedron T0 is selected, for example, $\Delta Py=P2-P0$), $\Delta c$ is lower-order five bits of C input data, $\Delta m$ is lower-order five bits of M input data, and $\Delta y$ is lower-order five bits of Y input data.

In the example described above, the cube is sub-segmentalized to six possible triangular pyramids (tetrahedrons) T0 to T5. Alternatively, interpolation calculation can be performed by sub-segmentalizing the cube to five possible triangular pyramids (tetrahedrons). Further alternatively, another interpolation calculation scheme that, for instance, sub-segmentalizes the cube to triangle poles can be employed.

Figure 1C:
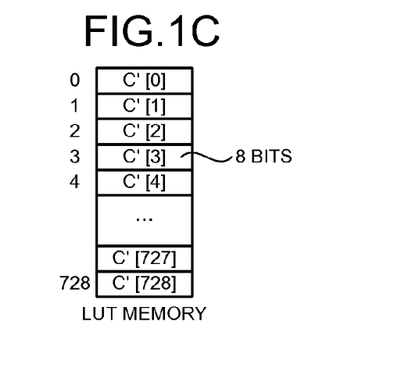
FIG. 1C is a diagrams illustrating a configuration of an LUT memory in which lattice point values for cyan determined by using the tetrahedral interpolation scheme are stored.

FIG. 1C illustrates a configuration of a lookup table (LUT) memory in which lattice-point values for C are stored. Stored in the LUT memory as data of the 729 lattice points is each 8-bit data which is same as the input data. Three LUT memories are used because the lattice-point data varies among C, M, and Y.

When interpolation from 4 lattice points is performed as in the example described above, conversion of 1 color (1 pixel) is performed by carrying out 4 LUT conversions. Accordingly, 12 LUT conversions are required to obtain results of interpolation calculation for 3 colors (1 pixel).

Figure 2:
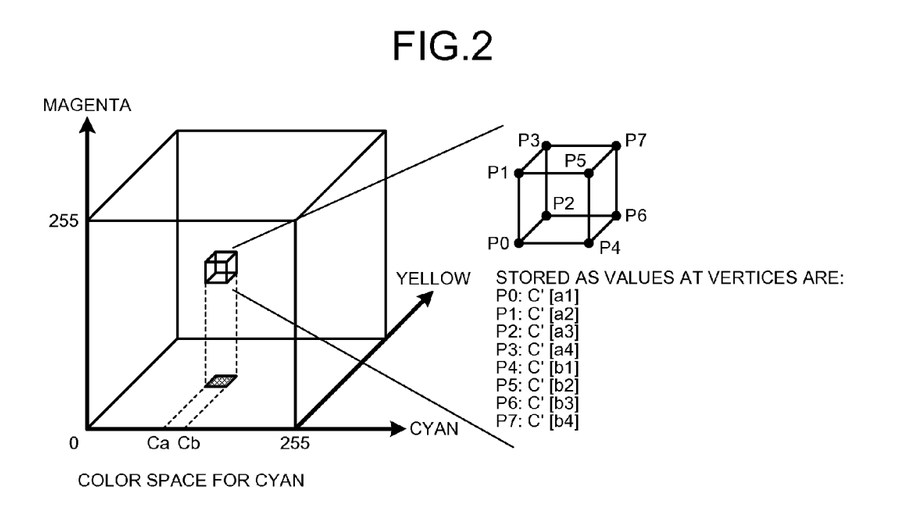
FIG. 2 is a diagram illustrating an example of lattice-point data for cyan.

FIG. 2 is a diagram illustrating an example of conventional lattice-point data (first lattice-point data) for C. A cube to which a C input value between Ca (a color component value of a lattice boundary surface) and Cb (a color component value of a lattice boundary surface) belongs is assumed. C'[a1] to C'[a4] and C'[b1] to C'[b4], each being 8-bit data, are stored as values at vertices of the cube. When interpolation calculation is performed using the tetrahedron T0 by the tetrahedral interpolation scheme illustrated in FIG. 1B, Cout, which is a corrected color value for C, is calculated according to the following Equation (2).

$$\begin{aligned}
Cout &= (\Delta Pc \times \Delta c + \Delta Pm \times \Delta m + \Delta Py \times \Delta y + P0 \times 16) \div 16 \quad (2)\\
&= \{(C'[b4] - C'[a4]) \times \Delta c + (C'[a4] - C'[a3]) \times \Delta m +\\
&\quad (C'[a3] - C'[a1]) \times \Delta y + C'[a1] \times 16\} \div 16
\end{aligned}$$

As described above, it is difficult to speed up color correction using the conventional interpolation computation because the conventional interpolation computation is performed using LUT memory that is large in memory size and by carrying out LUT conversions a large number of times.

Figure 3A:
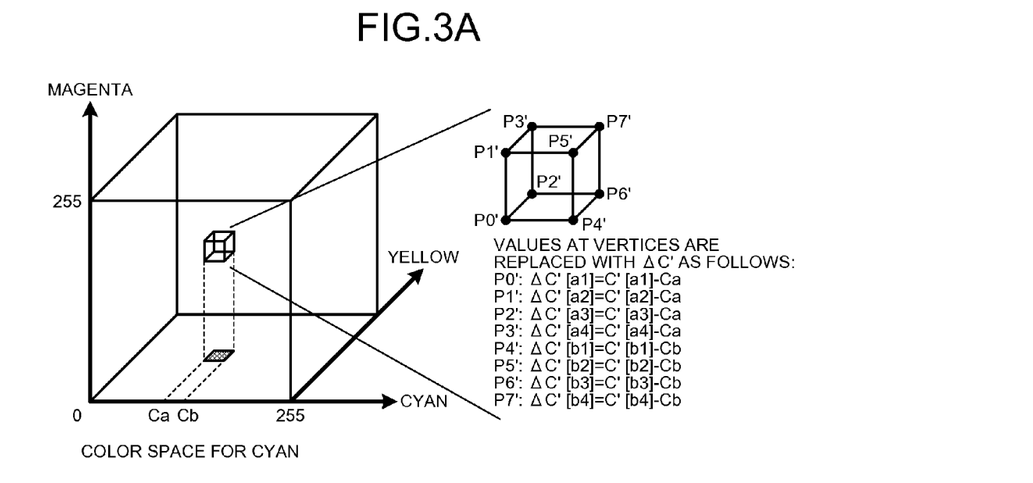
FIG. 3A is a diagram illustrating a method for reducing an amount of lattice-point data according to the present invention.

FIGS. 3A to 3E are diagrams illustrating a method for reducing an amount of lattice-point data according to the present invention. FIG. 3A illustrates an example in which an amount of lattice-point data for C is reduced. Specifically, according to the present invention, values ($\Delta C'[a1]$ to $\Delta C'[a4]$) obtained by subtracting Ca from C'[a1] to C'[a4], which are values of the lattice points P0 to P3 illustrated in FIG. 2, are stored as values at lattice points P0' to P3' (of which coordinates are same as those of the lattice points P0 to P3 illustrated in FIG. 2). Values ($\Delta C'[b1]$ to $\Delta C'[b4]$) obtained by subtracting Cb from C'[b1] to C'[b4], which are values of the lattice points P4 to P7 illustrated in FIG. 2, are stored as values at lattice points P4' to P7' (of which coordinates are same as those of the lattice points P4 to P7 illustrated in FIG. 2).

As described above, it is assumed that the present invention is applied to color correction by which CMY input image data is converted to finely-adjusted C'M'Y' output image data. In such color correction, ΔC'[a1] to ΔC'[a4] are values close to Ca, and ΔC'[b1] to ΔC'[b4] are values close to Cb. Accordingly, ΔC' illustrated in FIG. 3A are smaller in data amount than C' illustrated in FIG. 2. Whereas C' illustrated in FIG. 2 are 8-bit data, ΔC' illustrated in FIG. 3A are 5-bit data, for example. Thus, considerable reduction in the amount of lattice-point data is achieved.

Figure 3B:
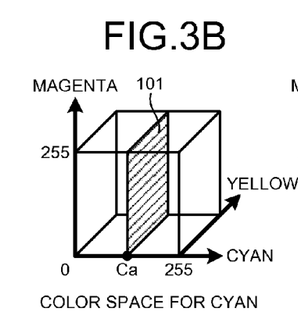
FIG. 3B is a diagram illustrating Ca (a color component value of a lattice boundary surface) of cyan.
Figure 3C:
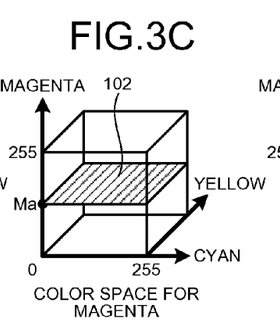
FIG. 3C is a diagram illustrating Ma (a color component value of a lattice boundary surface) of magenta.
Figure 3D:
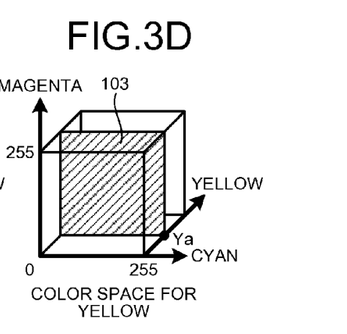
FIG. 3D is a diagram illustrating Ya (a color component value of a lattice boundary surface) of yellow.

FIGS. 3B to 3D are diagrams illustrating Ca of cyan, Ma of magenta, and Ya of yellow. Described below is Ca (the color component value of the lattice boundary surface) of cyan. The shaded area illustrated in FIG. 3B is a boundary surface 101 containing a plane where the lattice points P0', P1', P2' and P3' illustrated in FIG. 3A lie. Ca is a point of intersection of the boundary surface 101 and the cyan component axis. Similarly, ΔC' which are values obtained by subtracting Ca from C', which are values at the other lattice points Pn' illustrated in FIG. 3A, are stored as values at the other lattice points Pn' on the boundary surface 101.

As for Ma of magenta, the shaded area illustrated in FIG. 3C is a boundary surface 102 containing a plane where the lattice points P0', P2', P4' and P6' illustrated in FIG. 3A lie. Ma is a point of intersection of the boundary surface 102 and the magenta component axis. Ya of yellow is a point of intersection of a boundary surface 103 containing a plane where the lattice points P0', P1', P4' and P5' illustrated in FIG. 3A lie and the yellow component axis. As in the case of ΔC' described above, ΔM' and ΔY' are stored as values at the other lattice points of the boundary surfaces 102 and 103.

Although not illustrated in FIGS. 3B to 3D, Cb of cyan, Mb of magenta, and Yb of yellow are processed in a manner similar to that described above. For instance, Cb of cyan is a point of intersection of a boundary surface containing a plane where the lattice points P4', P5', P6' and P7' illustrated in FIG. 3A lie and the cyan component axis. ΔC', which are values obtained by subtracting Cb from C' of the other lattice points illustrated in FIG. 3A, are stored as values at the other lattice points.

Conversion from input data to output data is performed by performing interpolation calculation using the lattice-point values stored as values at the lattice points as illustrated in FIG. 3A and the lower-order five bits of the input data. When the tetrahedral interpolation scheme described above is used and the tetrahedron T0 is selected, the interpolation calculation is performed according to Equation (3). As a result, Cout, which is the color correction result for cyan, is obtained.

$$Cout = (\Delta Pc \times \Delta c + \Delta Pm \times \Delta m + \Delta Py \times \Delta y + P0 \times 16) \div 16 \quad (3)$$

$$= \{((\Delta C'[b4] + Cb) - (\Delta C'[a4] + Ca)) \times$$

$$\Delta c + ((\Delta C'[a4] + Ca) - (C'[a3] + Ca)) \times \Delta m +$$

$$((C'[a3] + Ca) - (C'[a1] + Ca)) \times$$

$$\Delta y + (C'[a1] + Ca) \times 16\} \div 16$$

$$= \{(\Delta C'[b4] - \Delta C'[a4] + Cb - Ca) \times$$

$$\Delta c + (\Delta C'[a4] - C'[a3]) \times \Delta m +$$

$$(C'[a3] - C'[a1]) \times \Delta y + (C'[a1] + Ca) \times 16\} \div 16$$

Equation (3) can be generalized to Equations (4) for Cout, Mout, and Yout.

$$Cout = \{(\Delta Pc' + Cb - Ca) \times \Delta c + \Delta Pm' \times \Delta m + \Delta Py \times \Delta y + ((P0' + Ca) \times 16)\} \div 16$$

$$Mout = \{\Delta Pc' \times \Delta c + (\Delta Pm' + Mb - Ma) \times \Delta m + \Delta Py' \times \Delta y + ((P0' + Ma) \times 16)\} \div 16$$

$$Yout = \{\Delta Pc' \times \Delta c + \Delta Pm' \times \Delta m + (\Delta Py' + Yb - Ya) \times \Delta y + ((P0' + Ya) \times 16)\} \div 16 \quad (4)$$

Note that an input value for cyan is between Ca and Cb, an input value for magenta is between Ma and Mb, and an input value for yellow is between Ya and Yb.

In Equations (3) and (4), Cout, Mout, and Yout are color correction results, ΔPc' is a difference value between vertices P' in the C-axis direction, ΔPm' is a difference value between vertices P' in the M-axis direction, ΔPy' is a difference value between vertices P' in the Y-axis direction, Δc is the lower-order five bits of the input data for cyan, Δm is the lower-order five bits of the input data for magenta, and Δy is lower-order five bits of the input data for yellow.

Figure 3E:
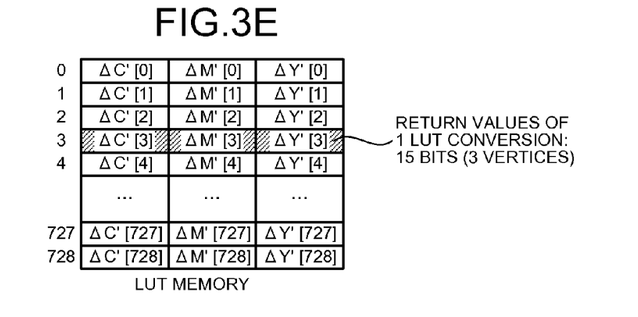
FIG. 3E is a diagram illustrating an example configuration of an LUT memory.

FIG. 3E is a diagram illustrating an example configuration of an LUT memory where lattice-point data (second lattice-point data) of the lattice points illustrated in FIG. 3A is stored. Referring to FIG. 3E where each lattice-point data is 5-bit data, the lattice-point data for the 3 colors, or CMY, is stored at one address (same lattice-point address).

By constructing hardware capable of LUT conversion that converts 15-bit input data (writing data (lattice-point data)) to 15-bit output data (read-out data (lattice-point data)) using the LUT memory illustrated in FIG. 3E and employing the tetrahedral interpolation scheme described above, color correction can be performed by carrying out 4 LUT conversions (i.e., accessing the memory 4 times). Accordingly, processing speed is increased.

Figure 4:
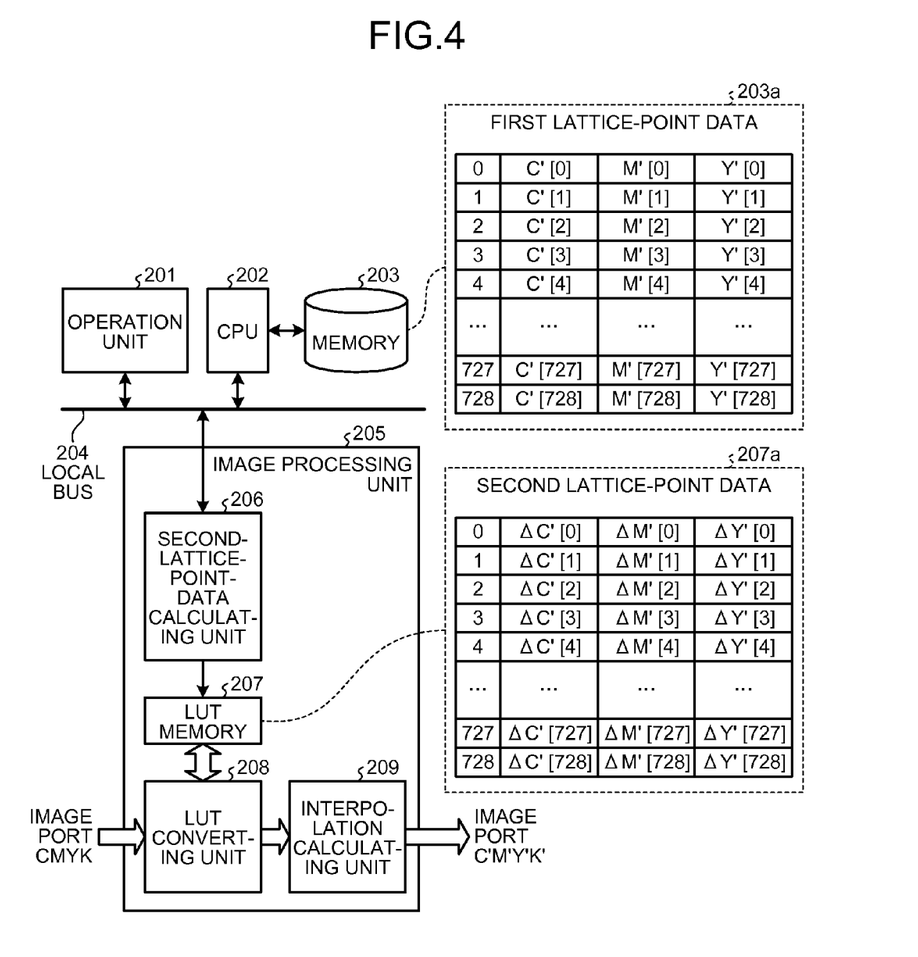
FIG. 4 is a diagram illustrating an example configuration of an image processing device according to a first embodiment of the present invention.

FIG. 4 is a diagram illustrating an example configuration of an image processing device according to the first embodiment. Referring to FIG. 4, the image processing device includes an operation unit 201, a central processing unit (CPU) 202, a memory 203, first lattice-point data 203a stored in the memory 203, a local bus 204, an image processing unit 205, a second-lattice-point-data calculating unit 206 that calculates second lattice-point data, an LUT memory 207, second lattice-point data 207a stored in the LUT memory 207, an LUT converting unit 208, and an interpolation calculating unit 209.

The first lattice-point data 203a illustrated in FIG. 2 is stored in the memory 203 connected to the CPU 202. It is possible to correct and modify the first lattice-point data 203a based on setting information fed from the operation unit 201. The second-lattice-point-data calculating unit 206 calculates the second lattice-point data 207a which is differences between the first lattice-point data 203a received via the local bus 204 and the color component values of the lattice boundary surface, stores the second lattice-point data 207a in the LUT memory 207, and supplies the second lattice-point data 207a to the LUT converting unit 208. The LUT converting unit 208 reads out the second lattice-point data 207a designated by CMYK image data input via an image port. The interpolation calculating unit 209 performs interpolation calculation using the read-out second lattice-point data 207a according to Equation (4), and outputs color-corrected C'M'Y'K' (K=K') image data via an image port.

Second Embodiment

Figure 5:
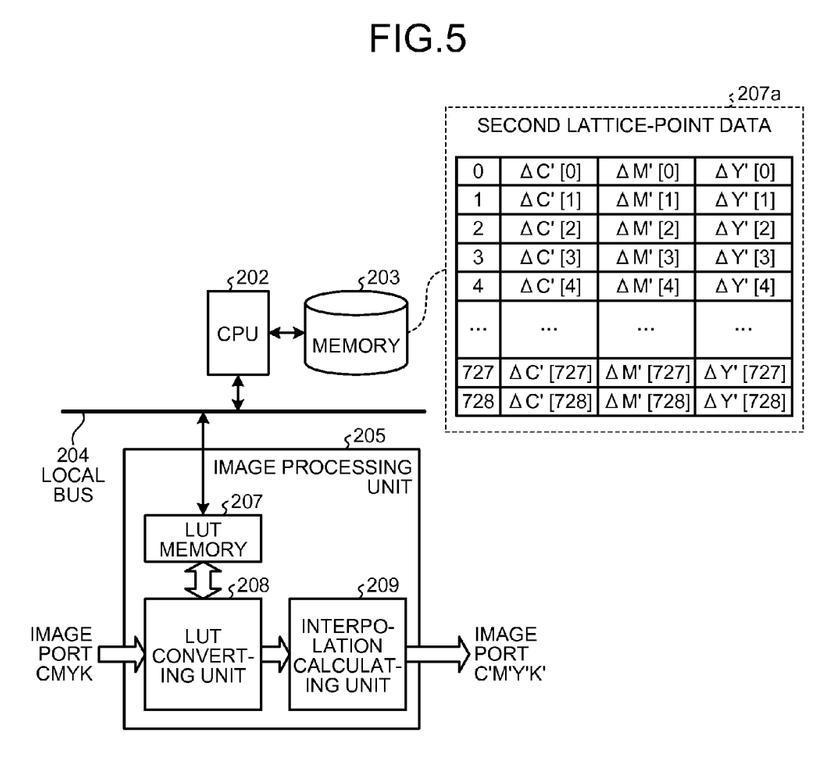
FIG. 5 is a diagram illustrating an example configuration of an image processing device according to a second embodiment of the present invention.

FIG. 5 illustrates an example configuration of an image processing device according to a second embodiment of the present invention. The image processing device according to the second embodiment differs from that of the first embodiment in that the second-lattice-point-data calculating unit 206 is omitted and the second lattice-point data 207*a* is stored in the memory 203. Specifically, in a situation where lattice-point data is fixed values, the second lattice-point data 207*a* can be stored in the memory 203. Accordingly, the need of calculating the second lattice-point data by the second-lattice-point-data calculating unit 206 can be omitted, and processing configuration and computations can be simplified.

The configuration according to the second embodiment is applicable to color correction performed to reduce color difference in bidirectional printing of an inkjet printer, which will be described later, in a case where color correction values are apparatus specific and user adjustment is unnecessary. As the second lattice-point data, second lattice-point data produced at a design phase and stored in the image processing device is preferably used.

Third Embodiment

Figure 6A:
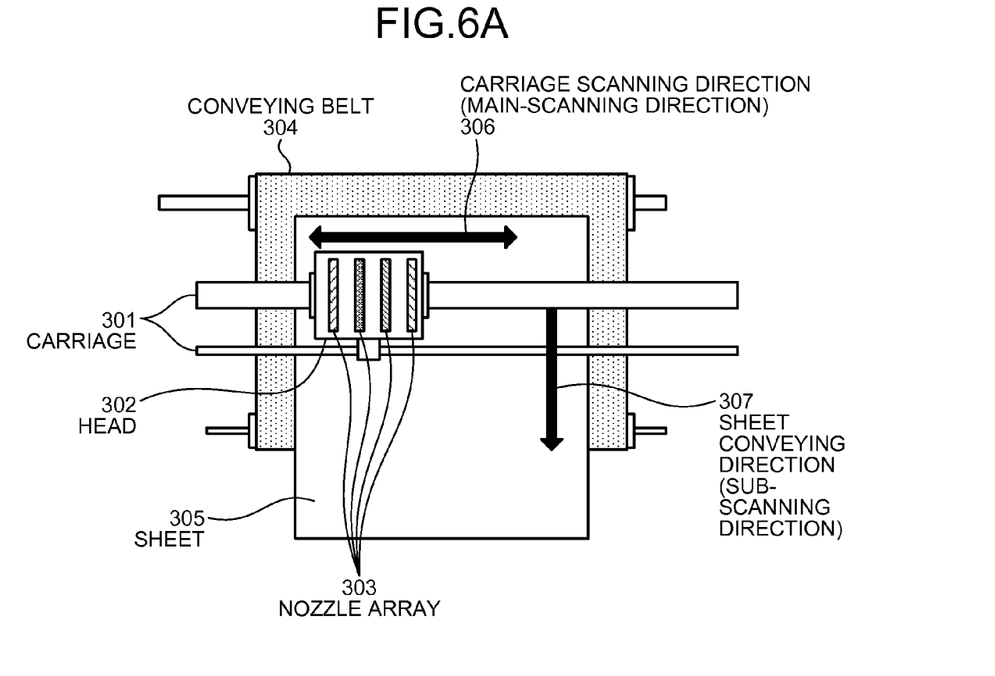
FIG. 6A is a diagram illustrating a configuration of a portion around a head of an inkjet printer.

FIG. 6A illustrates a configuration of a portion around a head of an inkjet printer (image forming apparatus). The inkjet printer forms an image on a sheet of paper 305 by ejecting ink through a nozzle array 303 of a head 302 arranged on a carriage 301 and moving in a main-scanning direction 306 of the head 302 onto the sheet 305. Hereinafter, in the main scanning direction 306, a scanning movement of the head 302 from left to right of the drawing is referred to as forward travel. A printing operation that does not perform printing on a way the head 302 returns to the left side after finishing printing by the forward travel is referred to as unidirectional printing, while a printing operation that performs printing also on the way the head 302 returns is referred to as bidirectional printing. In addition, in FIG. 6A, numeral 304 represents a conveying belt, and numeral 307 represents a sheet conveying direction (a sub scanning direction of the carrier 301).

Figure 6B:
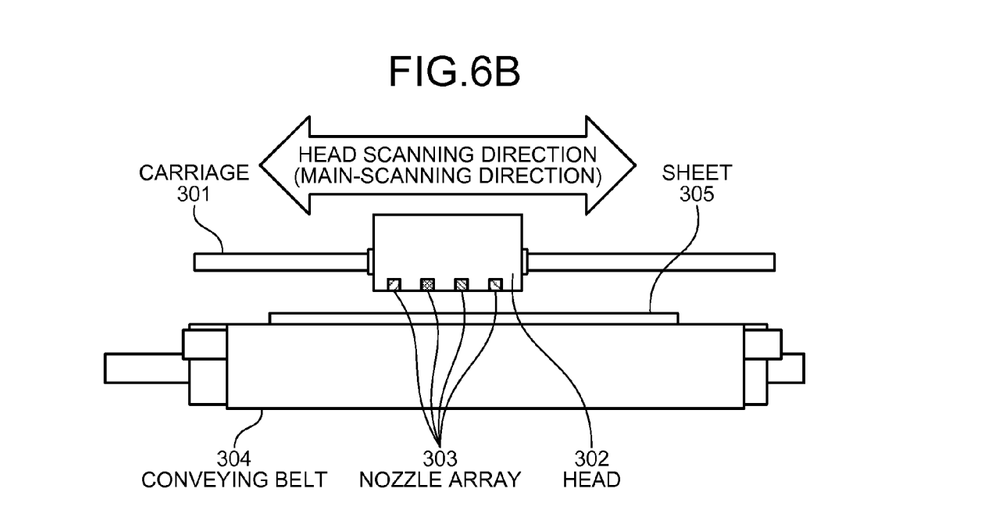
FIG. 6B is a cross-section view of the portion around the head of the inkjet printer.

FIG. 6B is a cross-sectional view of the portion around the head of the inkjet printer. The nozzle array 303 is arranged in an array on a bottom side (the side of the sheet) of the head 302, and normally ejects ink vertically downward.

Figure 7A:
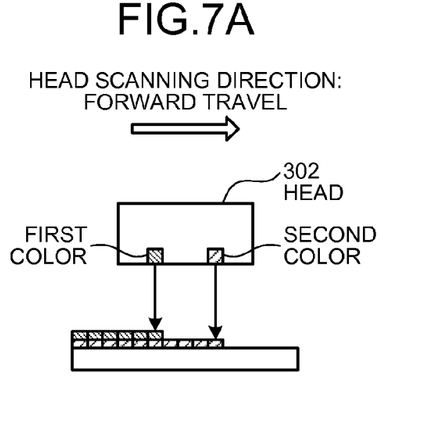
FIG. 7A is a diagram illustrating an example of a configuration of an image processing unit, to which the present invention is applied, of an inkjet printer during a forward-travel printing.
Figure 7B:
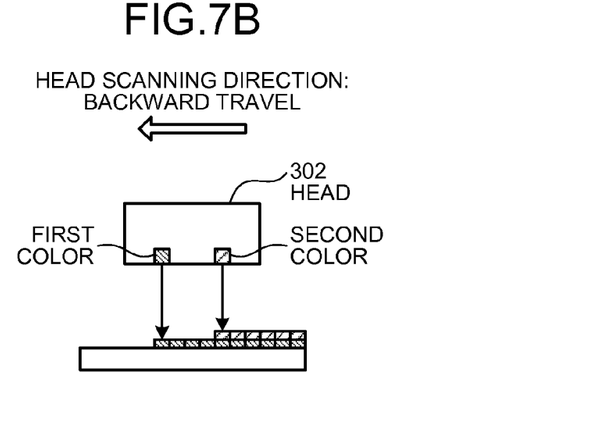
FIG. 7B is diagram illustrating an example of the configuration of the image processing unit, to which the present invention is applied, of the inkjet printer during a backward-travel printing.

FIGS. 7A and 7B are diagrams illustrating orders in which inks of different colors are ejected onto paper in bidirectional printing. FIG. 7A illustrates an example of forward-travel printing. In this case, a first color is ejected on a second color that serves as a background color. FIG. 7B illustrates an example of backward-travel printing. In this case, the second color is ejected on the first color that serves as a background color, which is the reverse of the forward-travel printing. A color difference is made because the order in which the inks of different colors are ejected onto the paper is transposed between the forward-travel printing and the backward-travel printing.

Figure 7C:
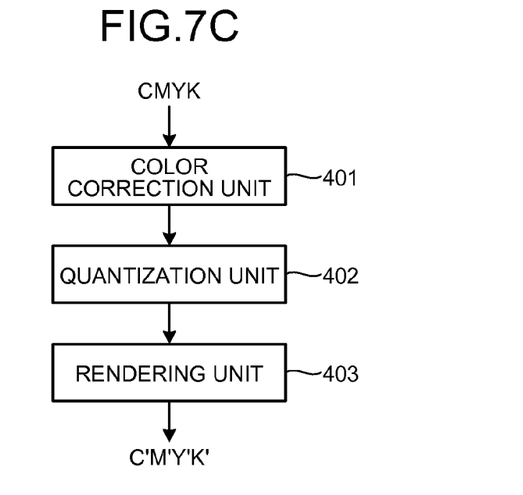
FIG. 7C is a diagram illustrating an example of the configuration of the image processing unit, to which the present invention is applied, of the inkjet printer.

FIG. 7C illustrates an example of a configuration of an image processing unit, to which the present invention is applied, of an inkjet printer. A color correction unit 401 performs color correction on four-color, or CMYK, input data to reduce the bidirectional color difference. This color correction is the fine adjustment between same colors described in the first and second embodiments. Accordingly, the present invention is applicable to this color correction.

The color correction is performed according to any one of the following schemes.
(1) The color correction is performed only on image data for the forward travel but not on image data for the backward travel.
(2) The color correction is performed image data for the backward travel but not on image data for the forward travel.
(3) The color correction is performed using second lattice-point data that differs between the forward travel and the backward travel.

A quantization unit 402 performs quantization (halftoning) on the color-corrected data. Thereafter, a rendering unit 403 performs processing related to an order according to which data is to be output and the like.

Fourth Embodiment

Figure 8:
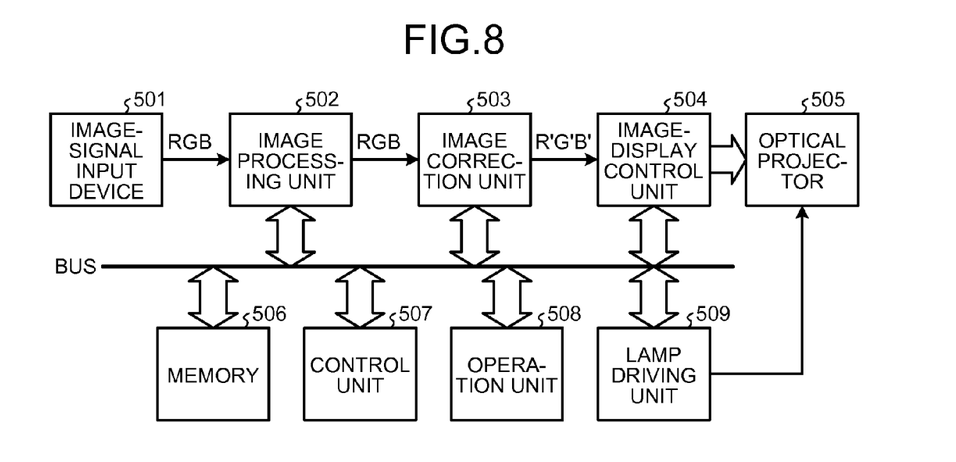
FIG. 8 is a diagram illustrating an example configuration of an image processing unit, to which the present invention is applied, of an image projector.

FIG. 8 illustrates an example configuration of an image processing unit, to which the present invention is applied, of an image projector. RGB signals are input via an image-signal input device 501. An image processing unit 502 performs image processing such as resolution conversion and filtering on the RGB signals. An image correction unit 503 performs keystone correction and color correction on the RGB signals undergone the image processing according to setting fed from an operation unit 508. The color correction performed by the image correction unit 503 is processing that uses a color space to convert the RGB signals and output finely-adjusted R'G'B' signals. Accordingly, it is possible to reduce an amount of lattice-point data by converting first lattice-point data to second lattice-point data according to the present invention. An image-display control unit 504 modulates light for R, G, and B emitted from a light source that is driven by a lamp driving unit 509 according to the finely-adjusted R'G'B' signals, thereby forming an image. An optical projector 505 throws a magnified image of the image on a screen. In addition, in FIG. 8, numeral 506 represents a memory in which the lattice point data are stored, and numeral 507 represents a control unit.

The present invention can be implemented by supplying a storage medium on which software program codes that implement functions of the embodiment described above is stored to a system or an apparatus and causing a computer (a CPU or a microprocessing unit (MPU)) of the system or the apparatus to read and execute the program codes stored in the storage medium. In this case, the program codes per se read out from the storage medium implement the functions of the embodiment described above. Examples of the storage medium for use in supplying the program codes include a hard disk drive (HDD), an optical disk, a magneto-optical disk, a non-volatile memory card, and a read only memory (ROM). Implementation of the functions of the embodiment described above is not limited to execution of the program codes read out from the storage medium by the computer. The functions of the embodiment described above can alternatively be implemented in such a manner that an operating system (OS) or the like running in the computer performs a part or all of actual processing according to commands of the program codes. The functions of the embodiment described above can alternatively be implemented in such a manner that the program codes read out from the storage medium are written to a memory of an extension board inserted to the computer or an extension unit connected to the computer, and thereafter a CPU of the extension board or the extension unit performs a part or all of actual processing according to commands of the program codes. The program codes for implementing the functions of the embodiment can be provided from a server by carrying out data communications with the server over a network.

According to an aspect of the present invention, reduction in amounts of memory for use in color correction and speed up of the color correction can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing device for performing color correction on first image data represented by a plurality of color components to obtain second image data represented by the same color components as the color components of the first image data, the image processing device comprising:
   a processor configured to calculate a second lattice-point value that is a difference between a first lattice-point value and a color component value, the first lattice-point values being values at lattice points on unit cubes that segment a color space made up of the plurality of color components, and the color component values being a value of a lattice point on an axis of a respective color component closest to the first lattice-point value such that, for each color component, the processor selects a closest lattice point from among two lattice points on the axis of the respective color component as the color component value;
   a memory configured to,
      the first lattice-point values, and
      store the calculated second lattice-point values on a lattice-point-by-lattice-point basis such that, for each unit cube, the second lattice-point values for each of the color components are stored at a same memory address representing a row of a lookup table, wherein
      the processor is configured to calculate the second image data by reading out, from a single one of the rows of the lookup table, the second lattice-point values designated by the first image data and performing interpolation calculation using the read-out second lattice-point values.

2. The image processing device according to claim 1, wherein the lattice-point values of the plurality of color components are stored at a same lattice-point address.

3. An image forming apparatus comprising the image processing device according to claim 1.

4. An image projector comprising the image processing device according to claim 1.

5. An image processing device for performing color correction on first image data represented by a plurality of color components to obtain second image data represented by the same color components as the color components of the first image data, the image processing device comprising:
   a memory configured to store, a difference between a lattice-point value and a color component value such that, for each unit cube that segments a color space made up of the plurality of color components, the differences for each of the color components are stored at a same memory address representing a row of a lookup table, the lattice-point values being values at lattice points on the unit cubes, and the color component value being a value of a lattice point on an axis of a respective color component closest to the lattice point such that for each color component, the color component value is a value of a closest lattice point from among two lattice points on the axis of the respective color component; and
   a processor configured to calculate the second image data by reading out, from a single one of the rows of the lookup table, the lattice-point values designated by the first image data and performing interpolation calculation using the read-out third lattice-point values.

6. The image processing device according to claim 5, wherein the lattice-point values of the plurality of color components are stored at a same lattice-point address.

7. An image forming apparatus comprising the image processing device according to claim 5.

8. An image projector comprising the image processing device according to claim 5.

9. An image processing method for performing color correction on first image data represented by a plurality of color components to obtain second image data represented by the same color components as the color components of the first image data, the image processing method comprising:
   segmentalizing a color space made up of the plurality of color components to a plurality of unit cubes; and
   storing to a memory first lattice-point values, the first lattice-point values being values at each of lattice points on the unit cubes;
   calculating a second lattice-point value, the second lattice-point value being a difference between the first lattice-point value and a color component value, the color component value being a value of a lattice point on an axis of a respective color component closest to the first lattice point such that, for each color component, the color component value is a value of a closest lattice point from among two lattice points on the axis of the respective color component;
   second storing including storing to a second storage unit the calculated second lattice-point value on a lattice-point-by-lattice-point basis; and
   interpolation calculating including calculating the second image data by reading out the second lattice-point value designated by the first image data by referring to the second storage unit and performing interpolation calculation using the read-out second lattice-point value.

* * * * *